US012669463B2

(12) United States Patent
Watanabe

(10) Patent No.: US 12,669,463 B2
(45) Date of Patent: Jun. 30, 2026

(54) INSPECTION APPARATUS AND INSPECTION METHOD

(71) Applicant: Tokyo Electron Limited, Tokyo (JP)

(72) Inventor: Shinjiro Watanabe, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 446 days.

(21) Appl. No.: 18/187,812

(22) Filed: Mar. 22, 2023

(65) Prior Publication Data

US 2023/0314362 A1 Oct. 5, 2023

(30) Foreign Application Priority Data

Mar. 30, 2022 (JP) ................................. 2022-056609

(51) Int. Cl.
 *G01N 35/00* (2006.01)
 *G01N 27/406* (2006.01)
 *G01N 35/04* (2006.01)

(52) U.S. Cl.
 CPC ... *G01N 27/4065* (2013.01); *G01N 35/00584* (2013.01); *G01N 2035/00306* (2013.01); *G01N 2035/0091* (2013.01); *G01N 2035/0491* (2013.01)

(58) Field of Classification Search
 CPC ......... G01N 27/4065; G01N 35/00584; G01N 2035/00306; G01N 2035/0091; G01N 2035/0491; G01R 31/2831; G01R 31/2887; G01R 31/2886; G01R 1/07314
 See application file for complete search history.

(56) References Cited

U.S. PATENT DOCUMENTS

| | | | | | |
|---|---|---|---|---|---|
| 5,410,259 | A | * | 4/1995 | Fujihara | G01R 31/2887 324/755.11 |
| 5,642,056 | A | * | 6/1997 | Nakajima | G01R 31/2887 324/754.03 |
| 5,828,225 | A | * | 10/1998 | Obikane | G01R 1/06705 324/750.25 |
| 6,297,656 | B1 | * | 10/2001 | Kobayashi | G01R 31/2886 324/750.19 |
| 6,809,536 | B2 | * | 10/2004 | Suzuki | G01R 1/07378 324/754.07 |

(Continued)

FOREIGN PATENT DOCUMENTS

| | | |
|---|---|---|
| JP | 2003-004554 | 1/2003 |
| JP | 2020-061590 | 4/2020 |
| KR | 10-1999-0013727 | 2/1999 |

*Primary Examiner* — David J Bolduc
(74) *Attorney, Agent, or Firm* — IPUSA, PLLC

(57) ABSTRACT

An inspection apparatus for electrical inspection of a substrate is provided. The inspection apparatus includes: a probe card including a plurality of probes; a stage on which the substrate is placed, the stage being configured to move the substrate relative to the probe card and to bring the substrate into contact with the probes; and a controller configured to control a movement of the stage. The controller calculates, using a first displacement amount based on a vertical load of the probe card and a second displacement amount based on an unbalanced load of the probe card that is inclined with respect to the vertical load, a three-dimensional correction amount for the unbalanced load of the probe card, and the controller moves the stage based on the three-dimensional correction amount.

17 Claims, 7 Drawing Sheets

(56) References Cited

U.S. PATENT DOCUMENTS

| | | | | |
|---|---|---|---|---|
| 7,262,618 B2* | 8/2007 | Komatsu | G01R 31/2891 | |
| | | | | 324/750.19 |
| 2004/0227532 A1* | 11/2004 | Orsillo | G01R 31/2887 | |
| | | | | 324/750.22 |
| 2004/0227535 A1* | 11/2004 | Kobayashi | G01R 31/2887 | |
| | | | | 324/750.19 |
| 2006/0097743 A1* | 5/2006 | Komatsu | G01R 31/2891 | |
| | | | | 324/750.17 |
| 2006/0145711 A1 | 7/2006 | Honma | | |
| 2008/0231300 A1* | 9/2008 | Yamada | G01R 31/2891 | |
| | | | | 324/756.03 |
| 2009/0039903 A1* | 2/2009 | Inomata | G01R 31/2831 | |
| | | | | 73/862.541 |
| 2011/0234247 A1* | 9/2011 | Ishii | G01R 31/2891 | |
| | | | | 324/750.16 |
| 2012/0074977 A1* | 3/2012 | Yang | G01R 31/2891 | |
| | | | | 324/754.11 |
| 2015/0177317 A1* | 6/2015 | Yamada | G01R 31/2893 | |
| | | | | 324/757.04 |
| 2018/0275192 A1* | 9/2018 | Yamada | H01L 21/68 | |
| 2018/0299487 A1* | 10/2018 | Yamada | G01R 1/06794 | |
| 2019/0187180 A1* | 6/2019 | Watanabe | G01R 1/06794 | |
| 2020/0033404 A1* | 1/2020 | Hyakudomi | G01R 31/2891 | |
| 2020/0096560 A1* | 3/2020 | Fujihara | G01R 31/2893 | |
| 2021/0341515 A1* | 11/2021 | Mochizuki | G01R 1/0491 | |

* cited by examiner

HORIZONTAL
COMPONENT

40

Z-AXIS
COMPONENT

UNBALANCED
LOAD

W

45s

Z

X

Y

45

45

40

45s

5 $\mu$m

HORIZONTAL
COMPONENT

30 $\mu$m $\mu$m $\mu$m

Y

X

INSPECTION APPARATUS AND INSPECTION METHOD

CROSS-REFERENCE TO RELATED APPLICATIONS

The present application is based on and claims priority to Japanese Patent Application No. 2022-056609 filed on Mar. 30, 2022, the contents of which are incorporated herein by reference in their entirety.

BACKGROUND OF THE INVENTION

Field of the Invention

The present disclosure relates to an inspection apparatus and an inspection method.

Description of the Related Art

Japanese Laid-Open Patent Publication No. 2020-61590 discloses an inspection apparatus that performs electrical inspection of devices under test on a wafer by transporting the wafer by an aligner (stage) and bringing the wafer into contact with a plurality of contact probes of a probe card. The inspection apparatus includes a θ-direction driving unit and an inclination adjustment mechanism on the stage, and performs an operation to align the facing surface of the wafer with the inclination of each contact probe of the probe card during the movement of the stage.

SUMMARY OF THE INVENTION

According to one aspect of the present disclosure, an inspection apparatus for electrical inspection of a substrate is provided. The inspection apparatus includes: a probe card including a plurality of probes; a stage on which the substrate is placed, the stage being configured to move the substrate relative to the probe card and to bring the substrate into contact with the probes; and a controller configured to control a movement of the stage. The controller calculates, using a first displacement amount based on a vertical load of the probe card and a second displacement amount based on an unbalanced load of the probe card that is inclined with respect to the vertical load, a three-dimensional correction amount for the unbalanced load of the probe card, and the controller moves the stage based on the three-dimensional correction amount.

DESCRIPTION OF THE EMBODIMENTS

Figure 1:
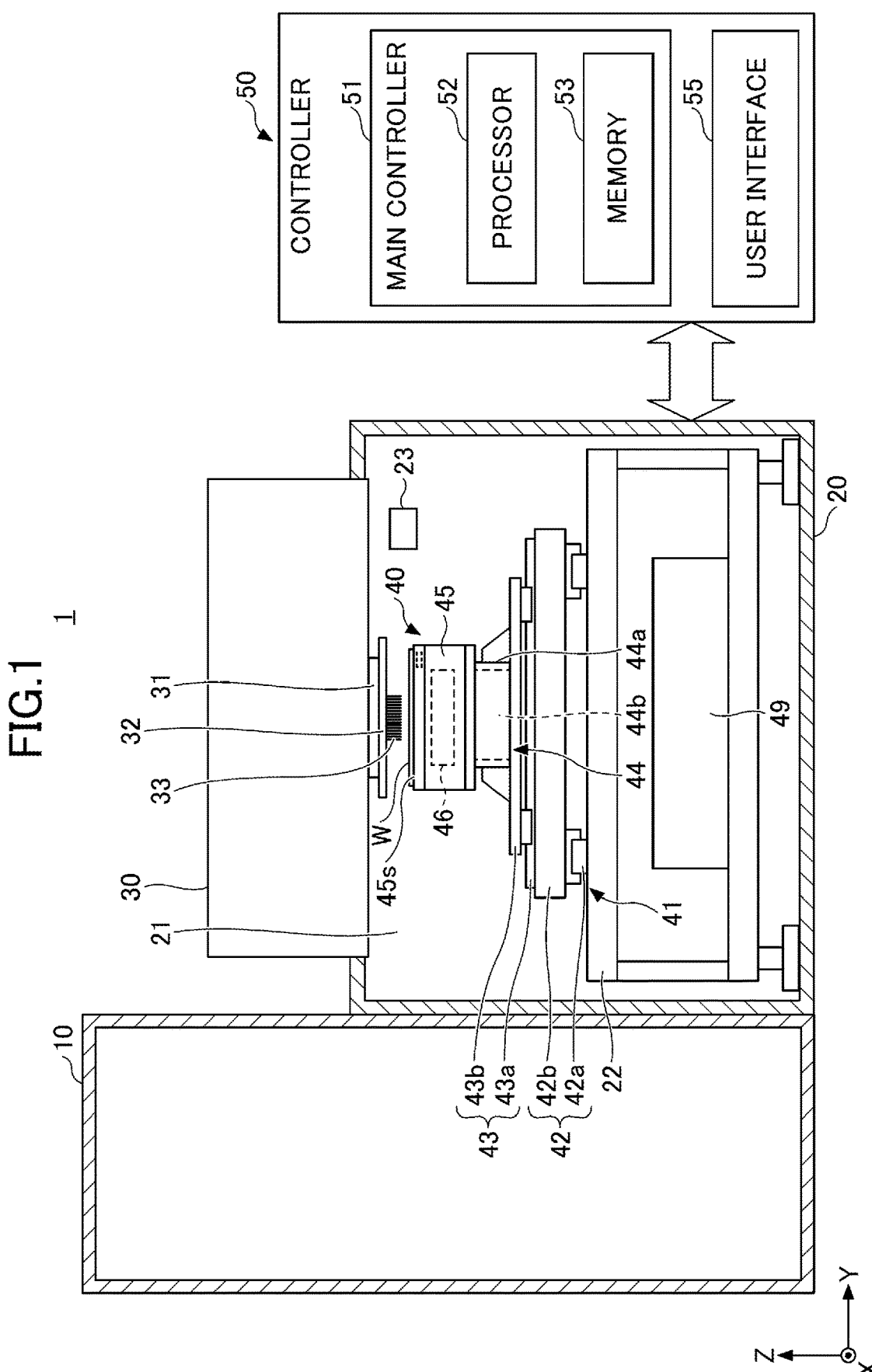
FIG. 1 is a schematic longitudinal sectional diagram illustrating a configuration of an inspection apparatus according to an embodiment.

Hereinafter, embodiments for implementing the present disclosure will be described with reference to the drawings. In each drawing, the same components are denoted by the same reference numerals, and overlapping descriptions may be omitted.

FIG. 1 is a schematic longitudinal sectional diagram illustrating a configuration of an inspection apparatus 1 according to an embodiment. As illustrated in FIG. 1, the inspection apparatus 1 according to the embodiment performs electrical inspection of a wafer W, which is an example of a substrate. On the surface of the wafer W, a plurality of semiconductor devices (LSI, semiconductor memory, and the like) are formed as devices under test (hereinafter also referred to as DUTs). In the electrical inspection, the presence or absence of abnormalities, electrical characteristics, and the like of the semiconductor devices are tested. The substrate is not limited to the wafer W, but may be a carrier, a glass substrate, a single chip, an electronic circuit board, and the like, on which the semiconductor devices are arranged.

The inspection apparatus 1 includes a loader 10 for transporting the wafer W, a housing 20 arranged adjacent to the loader 10, a tester 30 arranged above the housing 20, a stage 40 housed in the housing 20, and a controller 50 that controls each configuration of the inspection apparatus 1.

The loader 10 takes the wafer W from a front opening unified pod (FOUP) (not illustrated) and mounts the wafer W on the stage 40 moved inside the housing 20. The loader 10 also takes the inspected wafer W from the stage 40 and stores the wafer W in the FOUP.

The housing 20 is formed as a substantially rectangular box shape and includes an inspection space 21 for inspecting the wafer W therein. On the lower part of the inspection space 21, a stage 40 for transporting the wafer W is provided. In the inspection space 21, the wafer W placed on the stage 40 by the loader 10 is moved in the three-dimensional direction (the X-axis direction, the Y-axis direction, and the Z-axis direction) according to the operation of the stage 40.

On the upper part of the housing 20, a probe card 32 is held via an interface 31. The interface 31 includes a performance board (not illustrated) and a number of connection terminals, and is electrically connected to the tester 30 via a test head (not illustrated). The tester 30 is connected to the controller 50 of the inspection apparatus 1, and inspects the wafer W under the command of the controller 50.

The probe card 32 includes a plurality of probes 33 protruding downward in the inspection space 21. In the inspection by the inspection apparatus 1, each of the probes 33 comes into contact with a pad or a solder bump of each of the DUTs on the wafer W moved to the appropriate three-dimensional coordinate position by the stage 40. Thus, the appropriate circuit formed on one or more test boards (not illustrated) of the tester 30 is electrically conducted to each of the DUTs on the wafer W. In this conducting state, the tester 30 transmits an electrical signal from the test head to each of the DUTs on the wafer W, receives a device signal in response from each of the DUTs, and determines the presence or absence of abnormalities, electrical characteristics, and the like of each of the DUTs. The controller 50 moves the stage 40 in the X-axis direction, the Y-axis direction, and the Z-axis direction to shift the position on the wafer W, and sequentially repeats the inspection of each of the DUTs, thereby inspecting all the DUTs.

The stage 40 is provided in the housing 20 and transports the wafer W or the probe card 32 in the inspection space 21. For example, the stage 40 transports the wafer W from the loader 10 to the opposite position of the probe card 32, and raises the wafer W toward the probe card 32 to bring the wafer W into contact with the probes 33. Also, after the inspection, the stage 40 lowers the inspected wafer W from the probe card 32, and further transports the wafer W toward the loader 10.

Specifically, the stage 40 includes a movement unit 41 (an X-axis movement mechanism 42, a Y-axis movement mechanism 43, and a Z-axis movement mechanism 44) that can move in the X-axis direction, the Y-axis direction, and the Z-axis direction; a mounting table 45; and a stage controller 49. The housing 20 includes a frame structure 22 for supporting the movement unit 41 and the mounting table 45 of the stage 40, and the stage controller 49, in two upper and lower stages.

The X-axis movement mechanism 42 of the movement unit 41 includes a plurality of guide rails 42a fixed to the upper surface of the frame structure 22 and extending along the X-axis direction, and an X-axis movable body 42b arranged across the guide rails 42a. The X-axis movable body 42b includes an X-axis movement unit (a motor, a gear mechanism, and the like) inside, which is connected to the stage controller 49. The X-axis movable body 42b reciprocates in the X-axis direction based on the power supply from a motor driver (not illustrated) of the stage controller 49.

Similarly, the Y-axis movement mechanism 43 includes a plurality of guide rails 43a fixed to the upper surface of the X-axis movable body 42b and extending along the Y-axis direction, and a Y-axis movable body 43b arranged across the guide rails 43a. The Y-axis movable body 43b includes a Y-axis movement unit (a motor, a gear mechanism, and the like) inside, which is connected to the stage controller 49. The Y-axis movable body 43b reciprocates in the Y-axis direction based on the power supply from a motor driver (not illustrated) of the stage controller 49.

The Z-axis movement mechanism 44 includes a fixed body 44a provided in the Y-axis movable body 43b, and a Z-axis movable body 44b that may be raised and lowered in the Z-axis direction relative to the fixed body 44a. The mounting table 45 is held on the upper part of the Z-axis movable body 44b. For example, the fixed body 44a is formed in a cylindrical shape extending in the vertical direction and accommodates the Z-axis movable body 44b in the inner hole. The fixed body 44a supports the Z-axis movable body 44b via ball bearings 44c (see FIG. 2A) provided on the inner peripheral surface, so that the Z-axis movable body 44b can be raised and lowered.

The Z-axis movement mechanism 44 includes a Z-axis movement unit (a motor, a gear mechanism, and the like), which is not illustrated. The Z-axis movement unit is connected to the stage controller 49. The Z-axis moving body 44b is displaced in the Z-axis direction (the vertical direction) based on the power supply from a motor driver (not illustrated) of the stage controller 49 to the Z-axis movement unit, thereby raising and lowering the wafer W held on the mounting table 45. In addition to moving the mounting table 45 in the X-axis direction, the Y-axis direction, and the Z-axis direction, the movement unit 41 may be configured to rotate the mounting table 45 around the axis (in the θ direction).

The mounting table 45 is a device on which the wafer W is directly mounted, and the wafer W is held on a mounting surface 45s by an appropriate holding means. For example, when the wafer W is vacuum-adsorbed, the holding means includes a suction passage for suction in the mounting table 45, and also includes a pipe connected to the suction passage and a suction pump at appropriate locations.

Preferably, a temperature control mechanism 46 is provided inside the mounting table 45 to adjust the temperature of the wafer W during the inspection. As the temperature control mechanism 46, for example, a temperature control medium circulating device that circulates a temperature control medium in the mounting table 45, a heater that heats inside the mounting table 45, and the like can be used.

The stage controller 49 is connected to the controller 50 and controls the operation of the stage 40 based on a command from the controller 50. The stage controller 49 includes an integrated controller that controls the operation of the entire stage 40, a PLC and a motor driver that controls the operation of the movement unit 41, an illumination controller, a power supply unit, and the like (all not illustrated).

In the housing 20, a position detector 23 is provided that detects the relative position between each of the probes 33 of the probe card 32 and the wafer W mounted on the mounting table 45. Examples of the position detector 23 include a camera, a laser displacement meter, and the like. The position detector 23 detects the position of the wafer W in the movement of the stage 40, and transmits information on the position to the controller 50 or to the stage controller 49. The controller 50 adjusts the movement of the stage 40 appropriately based on the acquired information on the position.

The controller 50 includes a control body (also referred to as a main controller) 51 for controlling the entire inspection apparatus 1 and a user interface 55 connected to the control body 51. The control body 51 consists of a computer, a control circuit board, and the like.

For example, the control body 51 includes a processor 52, a memory 53, and an input/output interface, and an electronic circuit that are not illustrated. The processor 52 is a combination of one or more of a central processing unit (CPU), a graphics processing unit (GPU), an application specific integrated circuit (ASIC), a field-programmable gate array (FPGA), circuits consisting of multiple discrete semiconductors, and the like. The memory 53 is a combination of volatile memory and non-volatile memory (for example, a compact disc, a digital versatile disc (DVD), a hard disk, a flash memory, and the like), as appropriate.

As the user interface 55, a keyboard on which the user performs command input operations and the like, and a display for visualizing and displaying the operating status of the inspection apparatus 1, may be used. Alternatively, the user interface 55 may be devices such as a touch panel, a mouse, a microphone, and a speaker.

The controller 50 controls each configuration of the inspection apparatus 1 to perform the inspection of the wafer W. During the inspection of the wafer W, the inspection apparatus 1 moves the mounting table 45 of the stage 40 to bring the wafer W into contact with the probes 33 of the probe card 32. In the operation, the inspection apparatus 1 according to the present embodiment performs a 3D contact correction in which the amount of movement of the mounting table 45 in the X-axis direction, the Y-axis direction, and the Z-axis direction is corrected in response to the load applied from the probes 33.

Figure 2A:
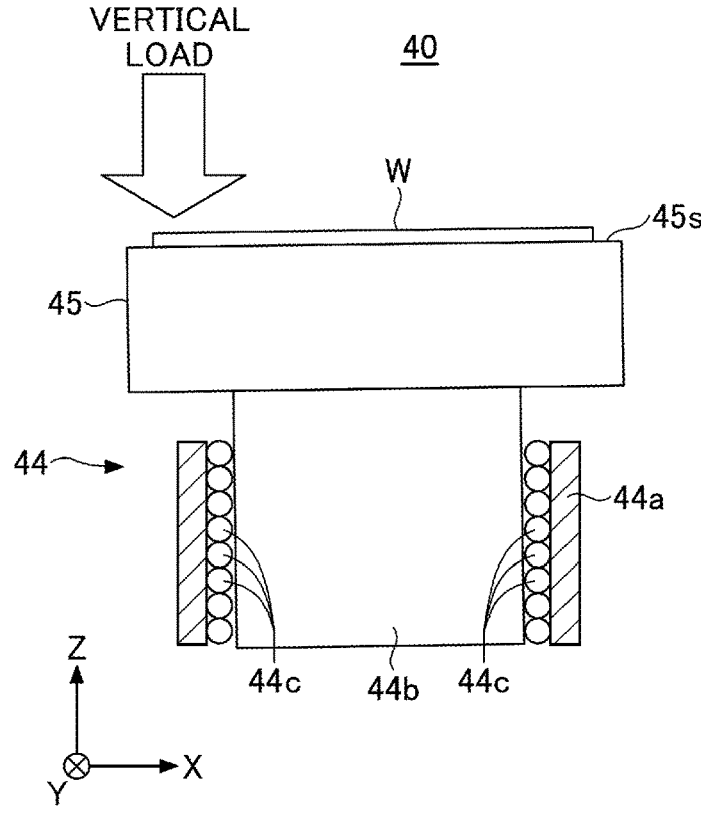
FIGS. 2A and 2B are schematic side views illustrating loads applied to a wafer and a mounting table by a probe card.
Figure 2B:
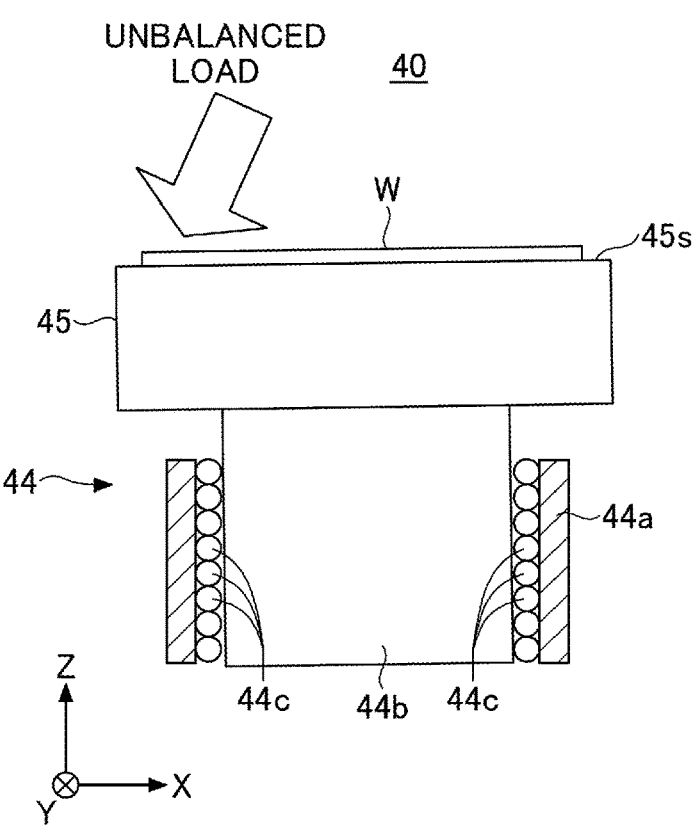

The load applied to the wafer W by the probes 33 includes a vertical load along the vertical direction and an unbalanced load inclined with respect to the vertical direction. FIGS. 2A and 2B are schematic side views illustrating the loads applied to the wafer W and the mounting table 45 by the probe card 32. FIG. 2A illustrates when the vertical load is applied, and FIG. 2B illustrates when the unbalanced load is applied.

As illustrated in FIG. 2A, the wafer W and the mounting table 45 are subjected to the vertical load by contacting the probes 33 protruding from the probe card 32 when the stage 40 moves. Even with the ball bearings 44c between the fixed body 44a and the Z-axis moving body 44b being in contact with them, the Z-axis moving body 44b and the mounting table 45 have a degree of freedom enough to move up and down. Thus, for example, when the probe 33 comes into contact with the outer periphery of the mounting table 45, that is, in a manner inclined with respect to the vertical load, the mounting table 45 including the wafer W and the Z-axis moving body 44b tend to tilt slightly.

When the load characteristic of the probe 33 of the probe card 32 is a vertical load that is completely aligned with the vertical direction (the Z-axis direction), the controller 50 may set a displacement amount for each of the coordinate positions of the mounting surface 45s and correct the amount of movement of the mounting table 45 according to the displacement amount. The displacement amount can be represented by the difference (distance) between the positions when no vertical load is applied and when the vertical load is applied. Accordingly, the stage 40 can be moved in a three-dimensional direction corresponding to the tilt of the mounting table 45. The displacement amount at each of the coordinate positions is recorded in advance by measuring the mechanical properties of the stage 40. The controller 50 may read the displacement amount at the three-dimensional coordinate position of the probe 33 at the time of contact, and calculate the correction amount using the displacement amount and the proportional formula.

Figure 3A:
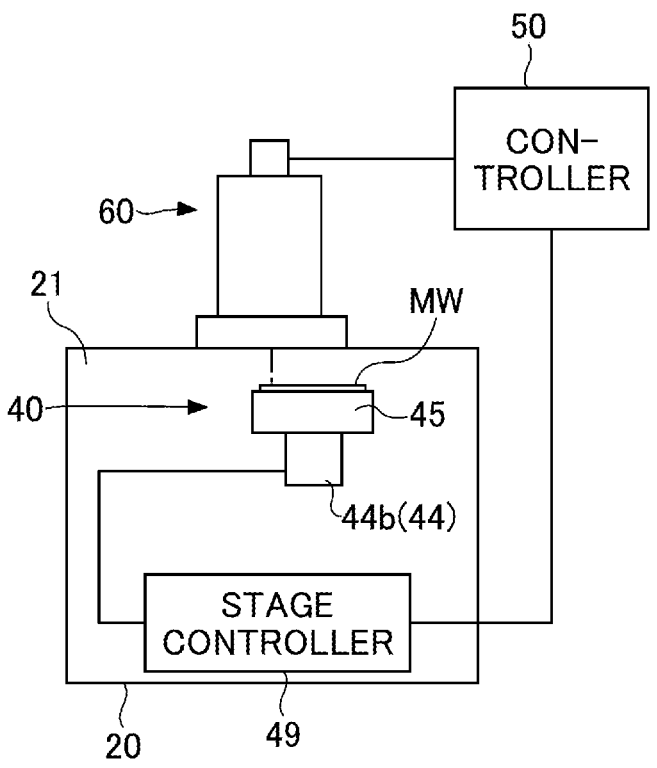
FIGS. 3A to 3D are schematic diagrams illustrating measurement of mechanical properties of a stage.
Figure 3B:
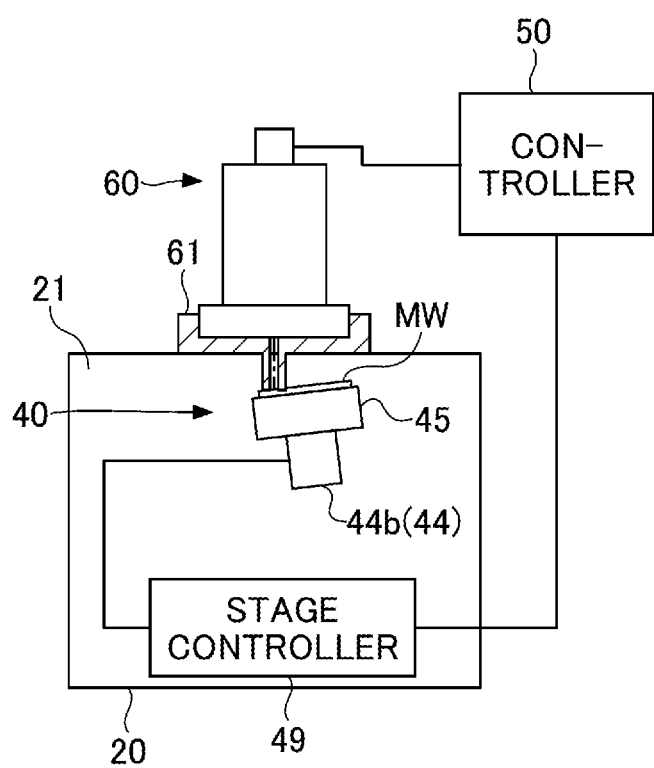
Figure 3C:
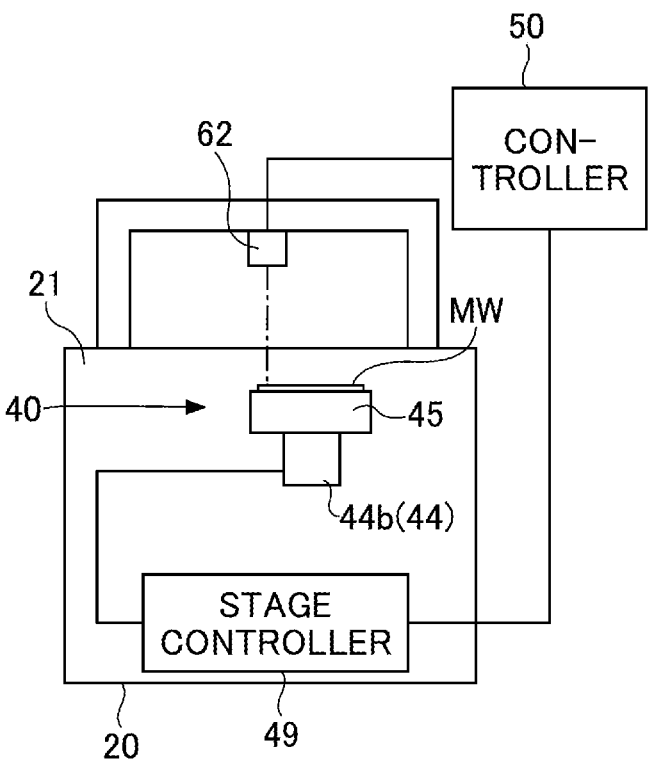
Figure 3D:
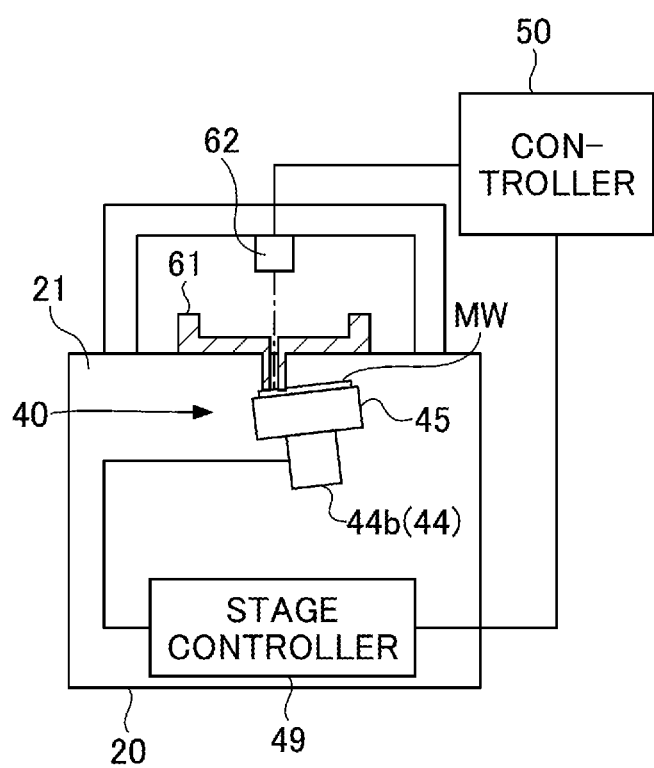

FIGS. 3A to 3D are schematic diagrams illustrating measurement of mechanical properties of the stage 40. FIG. 3A illustrates the measurement of the X-Y axes when no vertical load is applied, FIG. 3B illustrates the measurement of the X-Y axes when the vertical load is applied, FIG. 3C illustrates the measurement of the Z-axis when no vertical load is applied, and FIG. 3D illustrates the measurement of the Z-axis when the vertical load is applied.

As illustrated in FIG. 3A and FIG. 3B, in the measurement of mechanical properties in the X-axis direction and the Y-axis direction (that is, horizontally) of the stage 40, a camera unit 60, which is an X-Y displacement measuring instrument, is installed above the stage 40. Then, the controller 50 commands the stage controller 49 to move to virtually contact the probes (the same operation as when the actual wafer W is tested). In measuring mechanical properties, a wafer for measurement (hereinafter referred to as a measurement wafer MW) is held on the mounting surface 45s of the mounting table 45.

As illustrated in FIG. 3A, when the mounting table 45 is raised to the position where the measurement wafer MW is expected to come into contact with each probe, the camera unit 60 measures the X coordinate and the Y coordinate of the measurement wafer MW on which no vertical load is applied. In measuring the mechanical properties, a jig 61 for applying the vertical load is installed above the stage 40, as illustrated in FIG. 3B. Accordingly, the camera unit 60 measures the X coordinate and the Y coordinate of the measurement wafer MW on which the vertical load is applied.

By the above measurements, the controller 50 stores the X coordinate and the Y coordinate of an arbitrary coordinate position of the measurement wafer MW with and without the vertical load applied. Therefore, by subtracting the X coordinate and the Y coordinate of the measurement wafer MW when no vertical load is applied from the X coordinate and the Y coordinate of the measurement wafer MW when the vertical load is applied, the controller 50 can obtain the tilt amount of the mounting table 45 in the X axis direction and the Y axis direction when the vertical load is applied to an arbitrary coordinate position. The tilt amount (the X coordinate difference and the Y coordinate difference) of the mounting table 45 corresponds to an X-axis direction displacement amount $\Delta x$ and a Y-axis direction displacement amount $\Delta y$, when the vertical load is applied.

As illustrated in FIG. 3C and FIG. 3D, in the measurement of mechanical properties in the Z-axis direction (that is, the vertical direction) of the stage 40, a laser displacement meter 62, which is a Z-displacement meter, is installed above the stage 40. Then, as in the measurement of the X-Y axes, the controller 50 commands the stage controller 49 to move to virtually contact the probes.

That is, as illustrated in FIG. 3C, the laser displacement meter 62 measures the Z coordinate of an arbitrary coordinate position on the measurement wafer MW (the mounting surface 45s) on which no vertical load is applied. Further, as illustrated in FIG. 3D, after installing the jig 61, the laser displacement meter 62 measures the Z coordinate of an arbitrary coordinate position on the measurement wafer MW on which the vertical load is applied.

By the above measurement, the controller 50 stores the Z coordinate of an arbitrary coordinate position of the measurement wafer MW with and without the vertical load applied. Therefore, by subtracting the Z coordinate when no vertical load is applied from the Z coordinate when the vertical load is applied, the controller 50 can obtain the sinking amount of the mounting table 45 in the Z-axis direction when the vertical load is applied to an arbitrary coordinate position. The sinking amount of the mounting table 45 (the Z coordinate difference) corresponds to a Z-axis direction displacement amount $\Delta z$ when the vertical load is applied.

The measurement of the displacement amounts $\Delta x$, $\Delta y$, and $\Delta z$ is performed for all the measurement points set in the measurement wafer MW. The measurement points are set, for example, by dividing the top surface of the wafer W into a matrix.

The measurement of the displacement amounts $\Delta x$, $\Delta y$, and $\Delta z$ is performed multiple times by changing the vertical load applied from the jig 61 to the measurement wafer MW. Examples of the vertical load applied by the jig 61 to the measurement wafer MW include 0 kg, 50 kg, and 100 kg. Further, the measurement of the displacement amounts $\Delta x$, $\Delta y$, and $\Delta z$ is performed multiple times by changing the temperature applied to the measurement wafer MW. Examples of the temperature applied to the measurement wafer MW include $-50°$ C., $25°$ C., and $100°$ C. Therefore, at one measurement point, the controller 50 stores data of the displacement amounts $\Delta x$, $\Delta y$, and $\Delta z$ corresponding to the combination of the multiple vertical loads and the multiple temperatures, and the data is provided for every measurement point.

As illustrated in FIG. 2B, when the wafer W is moved by the stage 40, the probe card 32 may apply an unbalanced load, which is a load inclined (non-parallel) with respect to the vertical direction, to the wafer W as a load characteristic of the probe 33. The unbalanced load may occur when, for example, a completely vertical load is not achieved due to unevenness in the arrangement or shape of each of the probes 33 projecting downward from the probe card 32, or in the shape of the probe card 32. When the unbalanced load occurs on the probe card 32, the 3D contact correction of the stage 40 cannot be performed accurately even using the mechanical properties (the displacement amounts Δx, Δy, and Δz) measured assuming the vertical load.

Figures 4A, 4B:
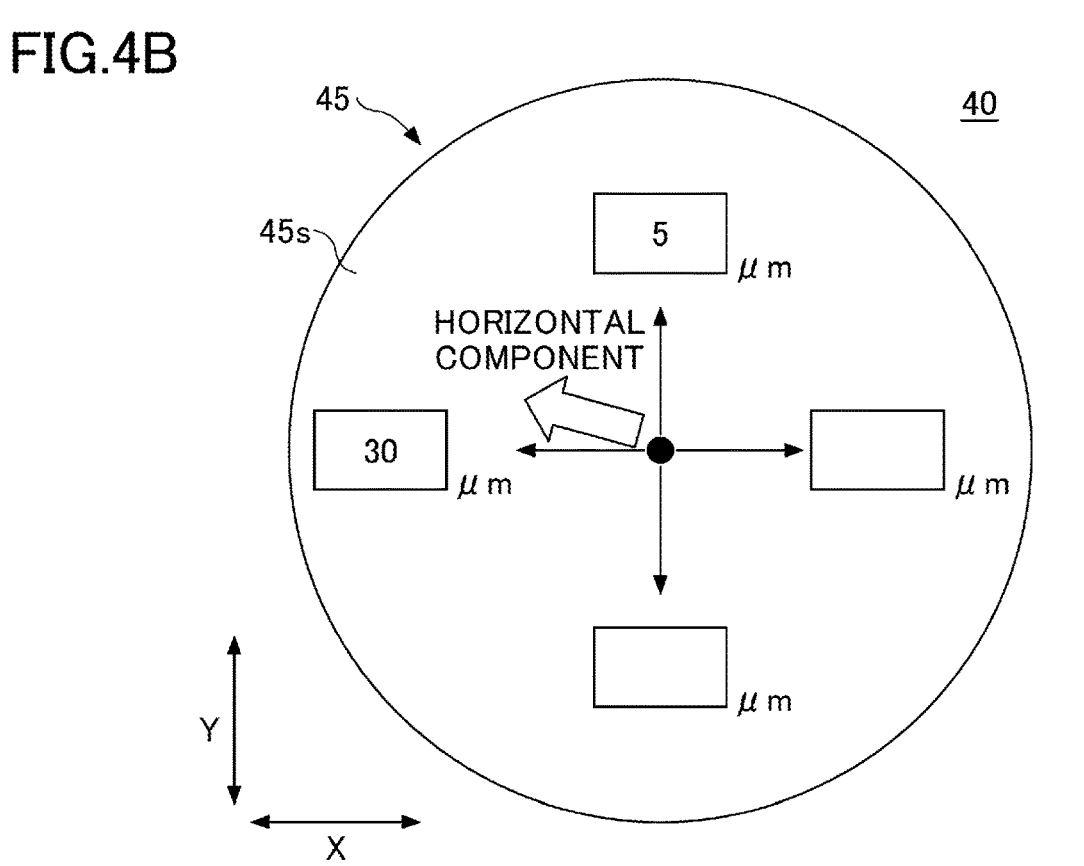
FIGS. 4A and 4B are explanatory diagrams illustrating a principle of an unbalanced load and settings of the probe card.

Therefore, the inspection apparatus 1 according to the present embodiment is configured to perform correction according to the probe card 32 mounted on the tester 30, taking into account the unbalanced load of the probe card 32. Hereinafter, the correction for the unbalanced load of the probe card 32 will be described with reference to FIGS. 4A and 4B. FIGS. 4A and 4B are explanatory diagrams illustrating the principle of the unbalanced load and settings of the probe card 32. FIG. 4A is a schematic side view, and FIG. 4B is a schematic plan view.

The unbalanced load of the probe card 32 can be said to include a component in the Z-axis direction, which is the vertical load, and a horizontal component, which is a vector along the horizontal direction. As the component in the Z-axis direction, the displacement amounts Δx, Δy, and Δz can be used, which are the mechanical properties of the stage 40 when the vertical load is applied to an arbitrary coordinate position.

The horizontal component can be further divided into a vector component in the X-axis direction and a vector component in the Y-axis direction. Hereinafter, the vector component in the X-axis direction is referred to as an X-axis component amount Δx', and the vector component in the Y-axis direction is referred to as a Y-axis component amount Δy'. For example, the X-axis component amount Δx' can be expressed as the displacement amount in the X-axis direction (in FIG. 4B, the displacement in units of μm in the left and right direction) with the center of the mounting surface 45s as the base point. Similarly, the Y-axis component amount Δy' can be expressed as the displacement amount in the Y-axis direction (in FIG. 4B, the displacement in units of μm in the up and down direction) with the center of the mounting surface 45s as the base point. The X-axis component amount Δx' and the Y-axis component amount Δy' can also be set in other units. For example, the ratios (%) of the vector component in the X-axis direction and the vector component in the Y-axis direction to the total unbalanced load may be used.

Because the arrangement, shape, and the like of the probe 33 is designed in the manufacturing process of the probe card 32, the information on the horizontal component (the X-axis component amount Δx' and the Y-axis component amount Δy') can be known in advance, according to the design content, or by experiments and simulations. In other words, the X-axis component amount Δx' and the Y-axis component amount Δy' can be said to be parameters that apply loads in the X-axis direction and the Y-axis direction of the wafer W with steady values, regardless of the coordinate position where the probe 33 contacts the wafer W. Taking FIGS. 4A and 4B as an example, the X-axis component amount Δx' is set to 30 μm and the Y-axis component amount Δy' is set to 5 μm. That is, when the configuration is such that the unbalanced load is applied to the wafer W, the probe card 32 includes the X-axis component amount Δx' and the Y-axis component amount Δy' of the unbalanced load as specification data in advance.

The inspection apparatus 1 may adopt a configuration in which, when the probe card 32 is used, the parameters of the unbalanced load of the probe card 32 (the X-axis component amount Δx' and the Y-axis component amount Δy') are input by the user via the user interface 55. At this time, the user only needs to input the X-axis component amount Δx' and the Y-axis component amount Δy', which are described in the specifications of the probe card 32. Alternatively, the inspection apparatus 1 may be configured to automatically set the information on the unbalanced load by reading the information stored in the probe card 32 when the probe card 32 is mounted. For example, when the inspection apparatus 1 reads the identification number of the probe card 32, the information on the unbalanced load can be acquired from the server by accessing the appropriate server not illustrated.

Then, when the probe card 32 includes the information about the unbalanced load, displacement amounts Δxp, Δyp, and Δzp of the unbalanced load can be calculated by adding the X-axis component amount Δx' and the Y-axis component amount Δy' of the unbalanced load to the displacement amounts Δx, Δy, and Δz of the vertical load, as in the following equations (1) and (2).

$$\Delta xp = \Delta x + \Delta x' \tag{1}$$

$$\Delta yp = \Delta y + \Delta y' \tag{2}$$

That is, in the 3D contact correction of the probe card 32 having the unbalanced load, the control body 51 of the controller 50 uses the displacement amounts Δxp, Δyp, and Δzp (=Δz) of the unbalanced load. Accordingly, even when the probe card 32 has the unbalanced load, the stage 40 can be moved with high accuracy and the wafer W can be brought into stable contact with each of the probes 33.

Figure 5:
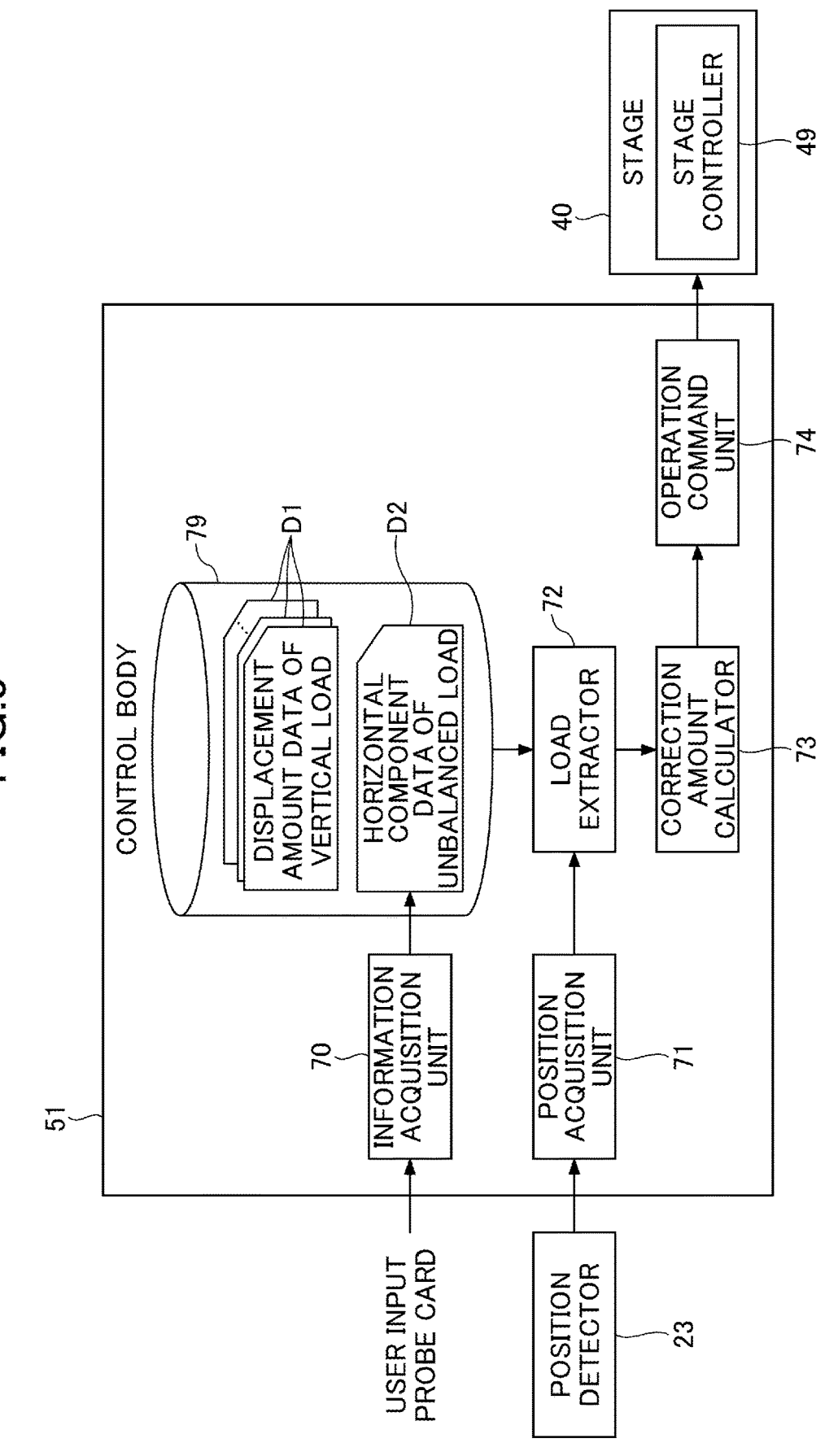
FIG. 5 is a block diagram illustrating functional blocks formed in a control body when a 3D contact correction is performed.

FIG. 5 is a block diagram illustrating functional blocks formed in the control body 51 when the 3D contact correction is performed. As illustrated in FIG. 5, an information acquisition unit 70, a position acquisition unit 71, a load extractor 72, a correction amount calculator 73, and an operation command unit 74 are formed in the control body 51 as a configuration for performing the correction that takes into account the unbalanced load of the probe card 32.

The information acquisition unit 70 acquires, when the probe card 32 is mounted on the tester 30, information of the probe card 32 including the information on the unbalanced load. The information of the probe card 32 may be input by the user via the user interface 55, or the control body 51 may automatically read the information of the probe card 32. In the user-input configuration, the information acquisition unit 70 displays an input screen for information input of the probe card 32 on the user interface 55. At this time, the information acquisition unit 70 displays, as an input screen for the horizontal component of the unbalanced load, information having an input column for the X-axis component amount Δx' and the Y-axis component amount Δy' as illustrated in, for example, FIG. 4B. Then, the information acquisition unit 70 stores the information input by the user in a correction data storage 79 formed in the memory 53.

The correction data storage 79 stores in advance, displacement data D1 of the vertical load for each of the coordinate positions measured by the method illustrated in FIG. 3, as the mechanical characteristics of the stage 40. In addition to the displacement data D1 of the vertical load, horizontal component data D2 of the unbalanced load is stored in the correction data storage 79.

The control body 51 continues to hold the horizontal component data D2 of the unbalanced load as long as it recognizes the mounting of the probe card 32 on the inspection apparatus 1. Then, the control body 51 automatically deletes the horizontal component data D2 of the unbalanced load when the probe card 32 is removed from the inspection apparatus 1. Thus, when a new probe card 32 is mounted, use of the data from the previously mounted probe card 32 can be prevented.

The position acquisition unit 71 acquires, when the stage 40 is moved, information of the coordinate positions (information on the position) of the wafer W and the mounting table 45 detected by the position detector 23, and temporarily stores the information in the memory 53.

The load extractor 72 references, when the stage 40 is moved, the memory 53 based on the coordinate positions acquired by the position acquisition unit 71, and extracts the mechanical properties (the displacement amounts $\Delta x$, $\Delta y$, and $\Delta z$) of the vertical load, the X-axis component amount $\Delta x'$ and the Y-axis component amount $\Delta y'$ of the unbalanced load, and the like, that are stored. In this case, when the X-axis component amount $\Delta x'$ and the Y-axis component amount $\Delta y'$ of the unbalanced load are 0 (blank), the probe card 32 applies the vertical load without applying the unbalanced load to the wafer W. When the X-axis component amount $\Delta x'$ and the Y-axis component amount $\Delta y'$ of the unbalanced load are values other than 0, the probe card 32 applies the unbalanced load to the wafer W.

The correction amount calculator 73 calculates the correction amount of the 3D contact correction. When the probe card 32 applies only the vertical load to the wafer W, the correction amount calculator 73 applies the displacement amounts $\Delta x$, $\Delta y$, and $\Delta z$ extracted by the load extractor 72 as they are. As described above, the displacement amounts $\Delta x$, $\Delta y$, and $\Delta z$ are measured in advance for each of the multiple temperatures and the multiple loads at each of the coordinate positions and stored in the correction data storage 79. For example, the correction amount calculator 73 acquires the load and temperature actually applied to the wafer W, refers to the two closest upper and lower data of the stored load and temperature for the detected load and detected temperature, and linearly approximates the two data to calculate the correction amount.

When the probe card 32 applies the unbalanced load to the wafer W, the correction amount calculator 73 calculates the displacement amounts $\Delta xp$, $\Delta yp$, and $\Delta zp$ for the unbalanced load using the above equations (1) and (2), and the like. Thus, the inspection apparatus 1 can obtain the correction amount of the 3D contact correction corresponding to both the vertical load and the unbalanced load according to the probe card 32.

The operation command unit 74 calculates the amount of movement in the three-dimensional direction when moving the stage 40, based on the target coordinate when the control body 51 makes the probe 33 contact with the predetermined DUT on the wafer W and the correction amount calculated by the correction amount calculator 73. Then, the operation command unit 74 sends a command in accordance with the calculated amount of movement to the stage controller 49. Thus, the stage controller 49 can move the wafer W on the mounting table 45 with high accuracy in the 3D contact correction.

Figure 6:
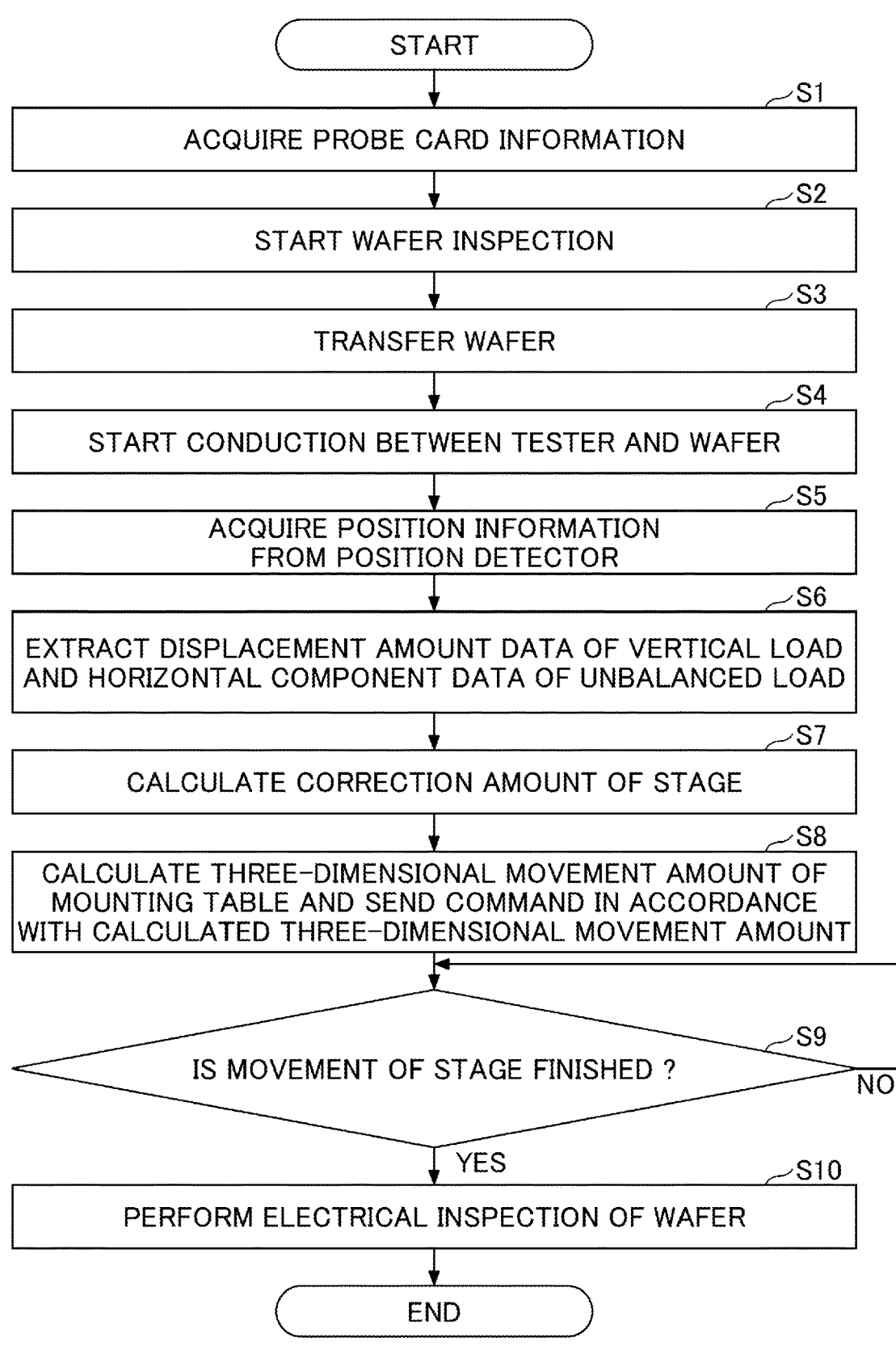
FIG. 6 is a flowchart illustrating an inspection method according to an embodiment.

The inspection apparatus 1 according to the present embodiment is basically configured as described above, and the operation (an inspection method) thereof will be described below with reference to FIG. 6. FIG. 6 is a flowchart illustrating the inspection method according to an embodiment.

The inspection apparatus 1 attaches the probe card 32 for inspecting the wafer W to the tester 30 before inspecting the wafer W. The information acquisition unit 70 of the control body 51 acquires information of the probe card 32 when the probe card 32 is attached (step S1). As described above, acquisition of information of the probe card 32 is performed by user input or automatically by the control body 51. When the acquired information of the probe card 32 includes the horizontal component data D2 of the unbalanced load, the information acquisition unit 70 stores the information in the correction data storage 79. As a result, the inspection apparatus 1 is prepared to perform the 3D contact correction taking into account the unbalanced load of the probe card 32.

Then, by receiving a test operation to perform the electrical inspection of the wafer W from the user via the user interface 55, the control body 51 starts inspection of the wafer W (step S2).

In the electrical inspection of the wafer W, the control body 51 transmits a command for the movement of the loader 10 and the stage 40 to the stage controller 49, delivers the wafer W from the loader 10 to the mounting table 45, and transports the wafer W in the inspection space 21 (step S3). At this time, the stage controller 49 moves the mounting table 45 in the horizontal direction by the X-axis movement mechanism 42 and the Y-axis movement mechanism 43 to make the contact positions of the wafer W face the probes 33, and then raises the mounting table 45 in the vertical direction (the Z-axis direction) by the Z-axis movement mechanism 44.

When the mounting table 45 is raised and the first probe 33 of the probes 33 contacts the wafer W, conduction between the tester 30 and the wafer W starts (step S4). When the conduction starts, the control body 51 performs the 3D contact correction in the movement of the mounting table 45.

In the 3D contact correction, the position acquisition unit 71 of the control body 51 detects the coordinate position where the probe 33 contacts the wafer W by the position detector 23, and acquires information on the position from the position detector 23 (step S5).

Then, the load extractor 72 of the control body 51 reads, based on the acquired information on the position, the displacement amount data D1 of the vertical load stored in the memory 53, and extracts the information when the horizontal component data D2 of the unbalanced load is stored (step S6).

The correction amount calculator 73 of the control body 51 calculates the displacement amounts $\Delta xp$, $\Delta yp$, and $\Delta zp$ for the unbalanced load as the correction amount of the stage 40, based on the read data of the displacement amounts $\Delta x$, $\Delta y$, and $\Delta z$ of the vertical load, the X-axis component amount $\Delta x'$, and the Y-axis component amount $\Delta y'$ of the unbalanced load (step S7). Alternatively, when the X-axis component amount $\Delta x'$ and the Y-axis component amount $\Delta y'$ of the unbalanced load are 0, the correction amount calculator 73 uses the displacement amounts $\Delta x$, $\Delta y$, and $\Delta z$ of the vertical load as the correction amount of the stage 40.

Then, the operation command unit 74 of the control body 51 calculates the amount of movement of the mounting table 45 in the three-dimensional direction by adding the calculated correction amount to the target coordinate for the predetermined DUT, and sends a command in accordance with the calculated amount of movement in the three-dimensional direction to the stage controller 49 (step S8). Thus, the stage controller 49 can move the mounting table 45 on which the wafer W is mounted with high accuracy in response to the command.

At the time of the 3D contact correction, the control body 51 determines whether the movement of the stage 40 is completed (step S9). When the stage 40 is moving (step S11:

NO), the 3D contact correction is continued. When the stage 40 is finished moving (step S9: YES), the process proceeds to step S10.

In step S10, the control body 51 performs an electrical inspection of the wafer W by the tester 30. By performing the 3D contact correction described above, the inspection apparatus 1 brings the probe 33 into precise contact with the target DUT on the wafer W. Therefore, the inspection apparatus 1 can stably perform the electrical inspection of the wafer W by the tester 30.

The technical ideas and effects of the present disclosure described in the above embodiments are described below.

The first aspect of the present disclosure is an inspection apparatus 1 for electrical inspection of a substrate (the wafer W). The inspection apparatus 1 includes: a probe card 32 including a plurality of probes 33; a stage 40 on which the substrate is placed, the stage being configured to move the substrate relative to the probe card 32 and to bring the substrate into contact with the probes 33; and a controller (the controller 50) configured to control a movement of the stage 40. The controller calculates, using a first displacement amount (the displacement amounts Δx, Δy, and Δz) based on a vertical load of the probe card 32 and a second displacement amount (the X-axis component amount Δx' and the Y-axis component amount Δy') based on an unbalanced load of the probe card 32 that is inclined with respect to the vertical load, a three-dimensional correction amount for the unbalanced load of the probe card 32, and the controller moves the stage 40 based on the three-dimensional correction amount.

According to the above, even when the unbalanced load is generated by the probe card 32, the inspection apparatus 1 can improve the correction accuracy of the movement of the stage 40 when the substrate (the wafer W) is brought into contact with the probes 33. That is, conventionally, only the correction based on the vertical load is performed without considering the unbalanced load of the probe card 32, whereas the inspection apparatus 1 of the present disclosure calculates the correction amount by adding the unbalanced load of the probe card 32. By using the correction amount, the inspection apparatus 1 can move the stage 40 with high accuracy to bring the substrate into contact with the probe 33.

In addition, the first displacement amount includes an X-axis direction displacement amount Δx, a Y-axis direction displacement amount Δy, and a Z-axis direction displacement amount Δz, and the second displacement amount includes an X-axis component amount Δx' and a Y-axis component amount Δy' as horizontal components of the unbalanced load of the probe card 32. The controller (the controller 50) calculates the three-dimensional correction amount by adding the X-axis component amount Δx' to the X-axis direction displacement amount Δx, and adding the Y-axis component amount Δy' to the Y-axis direction displacement amount Δy. Accordingly, the controller can easily and accurately calculate the displacement amounts Δxp, Δyp, and Δzp associated with the unbalanced load of the probe card 32.

In addition, the inspection apparatus 1 further includes a position detector 23 configured to detect a position where the substrate (the wafer W) contacts each of the probes 33. The controller (the controller 50) stores in advance a set of first displacement amounts (the displacement amounts Δx, Δy, and Δz), each of which corresponds to each of coordinate positions where the probes 33 contact the substrate, and the controller extracts the first displacement amount from the set of the first displacement amounts, according to a coordinate position where the probe 33 contacts, specified from information on the position detected by the position detector 23. Accordingly, the inspection apparatus 1 can use the appropriate first displacement amount for each of the coordinate positions, and the correction accuracy can be further improved.

In addition, the stage 40 includes a mounting table 45 for mounting the substrate (the wafer W). The controller (the controller 50) calculates the set of the first displacement amounts in advance by subtracting coordinates of the mounting table 45 when the vertical load is not applied to the mounting table 45 from coordinates of the mounting table 45 when the vertical load is applied to the mounting table 45, and stores the set of the first displacement amounts. Accordingly, the inspection apparatus 1 can appropriately obtain the first displacement amount according to the mechanical characteristics of the stage 40.

In addition, the second displacement amount is set for the probe card 32 mounted on the inspection apparatus 1, on a per-probe card basis. Accordingly, the inspection apparatus 1 can appropriately use the second displacement amount set for each of the probe cards 32 for the unbalanced load caused by the probes 33 of the probe card 32.

In addition, the controller (the controller 50) continues to hold the second displacement amount in a storage (the correction data storage 79) while the probe card 32 is mounted on the inspection apparatus 1, and deletes the second displacement amount from the storage when the probe card 32 is removed from the inspection apparatus 1. Accordingly, the inspection apparatus 1 can easily use the second displacement amount of the probe card 32 as long as the probe card 32 is mounted.

In addition, the controller (the controller 50) includes an information acquisition unit 70 configured to acquire the second displacement amount according to the probe card 32 mounted on the inspection apparatus 1. Accordingly, the inspection apparatus 1 can easily obtain the second displacement amount based on the unbalanced load.

In addition, the information acquisition unit 70 acquires the second displacement amount that is input by a user via a user interface 55. Accordingly, the inspection apparatus 1 can easily set the second displacement amount.

In addition, the information acquisition unit 70 acquires the second displacement amount based on information of the probe card 32 mounted on the inspection apparatus 1. Accordingly, the inspection apparatus 1 can reliably set the second displacement amount by reducing the labor of the user.

The second aspect of the present disclosure is an inspection method for electrical inspection of a substrate in an inspection apparatus 1. The inspection apparatus 1 includes: a probe card 32 including a plurality of probes 33; and a stage 40 on which the substrate (wafer W) is placed, the stage being configured to move the substrate relative to the probe card 32 and to bring the substrate into contact with the probes 33. The inspection method includes: calculating, using a first displacement amount based on a vertical load of the probe card 32 and a second displacement amount based on an unbalanced load of the probe card 32 that is inclined with respect to the vertical load, a three-dimensional correction amount for the unbalanced load; and moving the stage 40 based on the three-dimensional correction amount. Even in this case, the inspection method can improve the correction accuracy of the movement in the stage 40 that moves relative to the probe card 32.

The inspection apparatus and the inspection method of the present disclosed embodiments are illustrative in all respects and are not restrictive. Embodiments can be modified and improved in various forms without departing from the scope and spirit of the attached claims. The items described in the above multiple embodiments can take other configurations within a consistent range, and can be combined within a consistent range.

According to one aspect of the present disclosure, in a stage that moves relative to a probe card, correction accuracy of movement can be improved.

What is claimed is:

1. An inspection apparatus for electrical inspection of a substrate, the inspection apparatus comprising:
   a probe card including a plurality of probes;
   a stage on which the substrate is placed, the stage being configured to move the substrate relative to the probe card and to bring the substrate into contact with the probes;
   a jig disposed above the stage, the jig being configured to apply a vertical load in a vertical direction to the substrate placed on the stage; and
   a controller configured to control a movement of the stage, wherein
   the controller calculates, using a first displacement amount based on a vertical component of a load of the probe card and a second displacement amount based on a horizontal component of the load of the probe card, a three-dimensional correction amount for the probe card,
   the controller moves the stage based on the three-dimensional correction amount,
   the first displacement amount varies according to a contact position of the probe card relative to the substrate placed on the stage when the vertical load applied by the jig is aligned with the vertical direction, and
   the second displacement amount is caused by an unbalanced load of the probe card regardless of the contact position of the probe card relative to the substrate placed on the stage.

2. The inspection apparatus according to claim 1, wherein
   the first displacement amount includes an X-axis direction displacement amount $\Delta x$, a Y-axis direction displacement amount $\Delta y$, and a Z-axis direction displacement amount $\Delta z$,
   the second displacement amount includes an X-axis component amount $\Delta x'$ and a Y-axis component amount $\Delta y'$ as the horizontal component of the load of the probe card, and
   the controller calculates the three-dimensional correction amount by adding the X-axis component amount $\Delta x'$ to the X-axis direction displacement amount $\Delta x$, and adding the Y-axis component amount $\Delta y'$ to the Y-axis direction displacement amount $\Delta y$.

3. The inspection apparatus according to claim 1, further comprising:
   a position detector configured to detect a position where the substrate contacts each of the probes, wherein
   the controller stores in advance a set of first displacement amounts, each of which corresponds to each of coordinate positions where the probes contact the substrate, and
   the controller extracts the first displacement amount from the set of the first displacement amounts, according to a coordinate position specified from information on the position detected by the position detector.

4. The inspection apparatus according to claim 3, wherein the stage includes a mounting table for mounting the substrate, and the controller calculates the set of the first displacement amounts in advance by subtracting coordinates of the mounting table when the vertical load is not applied to the mounting table from coordinates of the mounting table when the vertical load is applied to the mounting table, and stores the set of the first displacement amounts.

5. The inspection apparatus according to claim 1, wherein the second displacement amount is set for the probe card mounted on the inspection apparatus.

6. The inspection apparatus according to claim 5, wherein the controller continues to hold the second displacement amount in a storage while the probe card is mounted on the inspection apparatus, and deletes the second displacement amount from the storage when the probe card is removed from the inspection apparatus.

7. The inspection apparatus according to claim 6, wherein the controller is further configured to acquire the second displacement amount according to the probe card mounted on the inspection apparatus.

8. The inspection apparatus according to claim 7, wherein the second displacement amount acquired by the controller is input by a user via a user interface.

9. The inspection apparatus according to claim 7, wherein the second displacement amount acquired by the controller is based on information of the probe card mounted on the inspection apparatus.

10. The inspection apparatus according to claim 2, further comprising:
    a position detector configured to detect a position where the substrate contacts each of the probes, wherein
    the controller stores in advance a set of first displacement amounts, each of which corresponds to each of coordinate positions where the probes contact the substrate, and
    the controller extracts the first displacement amount from the set of the first displacement amounts, according to a coordinate position specified from information on the position detected by the position detector.

11. The inspection apparatus according to claim 10, wherein
    the stage includes a mounting table for mounting the substrate, and
    the controller calculates the set of the first displacement amounts in advance by subtracting coordinates of the mounting table when the vertical load is not applied to the mounting table from coordinates of the mounting table when the vertical load is applied to the mounting table, and stores the set of the first displacement amounts.

12. The inspection apparatus according to claim 11, wherein the second displacement amount is set for the probe card mounted on the inspection apparatus.

13. The inspection apparatus according to claim 12, wherein the controller continues to hold the second displacement amount in a storage while the probe card is mounted on the inspection apparatus, and deletes the second displacement amount from the storage when the probe card is removed from the inspection apparatus.

14. The inspection apparatus according to claim 13, wherein the controller is further configured to acquire the second displacement amount according to the probe card mounted on the inspection apparatus.

15. The inspection apparatus according to claim 13, wherein the second displacement amount acquired by the controller is input by a user via a user interface.

16. The inspection apparatus according to claim 13, wherein the second displacement amount acquired by the controller is based on information of the probe card mounted on the inspection apparatus.

17. An inspection method for electrical inspection of a substrate in an inspection apparatus, the inspection apparatus including: a probe card including a plurality of probes; a stage on which the substrate is placed, the stage being configured to move the substrate relative to the probe card and to bring the substrate into contact with the probes; and a jig disposed above the stage, the jig being configured to apply a vertical load in a vertical direction to the substrate placed on the stage, the inspection method comprising:

calculating, using a first displacement amount based on a vertical component of a load of the probe card and a second displacement amount based on a horizontal component of the load of the probe card, a three-dimensional correction amount for the probe card; and moving the stage based on the three-dimensional correction amount, wherein the first displacement amount varies according to a contact position of the probe card relative to the substrate placed on the stage when the vertical load applied by the jig is aligned with the vertical direction, and the second displacement amount is caused by an unbalanced load of the probe card regardless of the contact position of the probe card relative to the substrate placed on the stage.

* * * * *